(12) United States Patent
Tsai

(10) Patent No.: US 7,802,115 B2
(45) Date of Patent: Sep. 21, 2010

(54) APPARATUS AND METHOD FOR ENERGIZING A COMPUTER IN A VEHICLE

(75) Inventor: Shen Fa Tsai, Taipei (TW)

(73) Assignee: Giga-Byte Technology Co., Ltd., Taipei (TW)

( * ) Notice: Subject to any disclaimer, the term of this patent is extended or adjusted under 35 U.S.C. 154(b) by 852 days.

(21) Appl. No.: 11/700,054

(22) Filed: Jan. 31, 2007

(65) Prior Publication Data

US 2008/0180676 A1  Jul. 31, 2008

(51) Int. Cl.
*G06F 1/28* (2006.01)

(52) U.S. Cl. .................. 713/310; 307/10.1; 323/318; 713/300

(58) Field of Classification Search ........... 713/300, 713/310; 307/10.1; 323/318
See application file for complete search history.

(56) References Cited

U.S. PATENT DOCUMENTS

| 6,393,573 | B1 * | 5/2002 | Gillespie et al. ............ 713/324 |
| 6,598,168 | B1 * | 7/2003 | Chen ............................ 713/300 |
| 7,055,064 | B2 * | 5/2006 | Lin ............................ 714/23 |

* cited by examiner

*Primary Examiner*—Albert Wang
(74) *Attorney, Agent, or Firm*—Rosenberg Klein & Lee

(57) ABSTRACT

A vehicle includes a power supply and an ignition. A computer includes a mother board with a converting circuit for converting electricity. A switching circuit controls the transfer of electricity to the converting circuit from the power supply. A detecting circuit detects the state of the ignition, sends an ON signal and instructs the switching circuit to conduct the transfer if the ignition is turned on, and sends an OFF signal and instructs the switching circuit to interrupt the transfer if the ignition is turned off. A central processing unit receives electricity from the converting circuit and turns on or off the computer. A south bridge controller receives electricity from the converting circuit and instructs the central process to turn on the computer on receiving the ON signal or turn off the computer on receiving the OFF signal.

11 Claims, 2 Drawing Sheets

APPARATUS AND METHOD FOR ENERGIZING A COMPUTER IN A VEHICLE

BACKGROUND OF INVENTION

1. Field of Invention

The present invention relates to a computer and, more particularly, to an apparatus and method for energizing a laptop computer in a vehicle.

2. Related Prior Art

A conventional method for automatically turning off a computer is disclosed in Taiwanese Patent Publication No. 455756. A computer 20 is connected to a power supply of a vehicle such as a car, aircraft and a boat through a controller 10 for turning off the computer 20.

When an ignition of the vehicle is turned on, the computer 20 is energized by the power supply of the vehicle through the controller 10. When the ignition is turned off, an OFF signal is sent to the computer 20 for turning off the computer 20. It generally takes a period of time (the "normal period") to turn off the computer 20. After turning off the computer 20, a FINISH signal is provided. On receiving the FINISH signal, the controller 10 stops the energizing. Alternatively, if not receiving the FINISH signal within a pre-determined period of time, the controller 10 stops the energizing. The pre-determined period is longer than the normal period.

Problems have been encountered in using the conventional method. Firstly, it takes quite some time for the controller 10 to normally operate after the ignition is turned on since the controller 10 must go through a process for initiation.

Secondly, the controller 10 is complicated because it includes a mechanism to detect the state of a switch 29 of the computer 20, a mechanism to provide the OFF signal and a mechanism to receive the FINISH signal.

Thirdly, the controller 10 cannot turn on and off the computer 20. The controller 10 only controls the energizing of the computer 20. The actuation and termination of the computer 20 is done by an element 28 operatively connected to the switch 29.

The present invention is therefore intended to obviate or at least alleviate the problems encountered in prior art.

SUMMARY OF INVENTION

An objective of the present invention is to provide an efficient simple computer for use in a vehicle.

Another objective of the present invention is to provide a structurally simple computer for use in a vehicle.

Another objective of the present invention is to provide a vehicle with a computer that can automatically be turned on if an ignition of the vehicle is turned on.

The objectives are reached by providing a mother board including a converting circuit, a switching circuit, a detecting circuit, a central processing unit and a south bridge controller. The converting circuit converts electricity. The switching circuit controls the transfer of electricity to the converting circuit from a power supply of a vehicle. The detecting circuit detects the state of an ignition of the vehicle. If the ignition is turned on, the detecting circuit sends an ON signal and instructs the switching circuit to conduct the transfer. If the ignition is turned off, the detecting circuit sends an OFF signal and instructs the switching circuit to interrupt the transfer. The central processing unit receives electricity from the converting circuit and turns on or off the computer. The south bridge controller receives electricity from the converting circuit and instructs the central process to turn on the computer on receiving the ON signal or turn off the computer on receiving the OFF signal.

Another objective of the present invention is to provide a converter for converting electricity from a format for a vehicle into another format for a computer.

The forgoing objective is reached by providing a converter including a converting circuit, a switching circuit and a detecting circuit. The converting circuit converts the electricity. The switching circuit controls the transfer of electricity to the converting circuit from the power supply of the vehicle. The detecting circuit for detects the state of the ignition of the vehicle. If the ignition is turned on, the detecting circuit sends an ON signal and instructs the switching circuit to conduct the transfer. If the ignition is turned off, the detecting circuit sends an OFF signal and instructs the switch circuit to interrupt the transfer.

Other objectives, advantages and features of the present invention will become apparent from the following description referring to the attached drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 1:
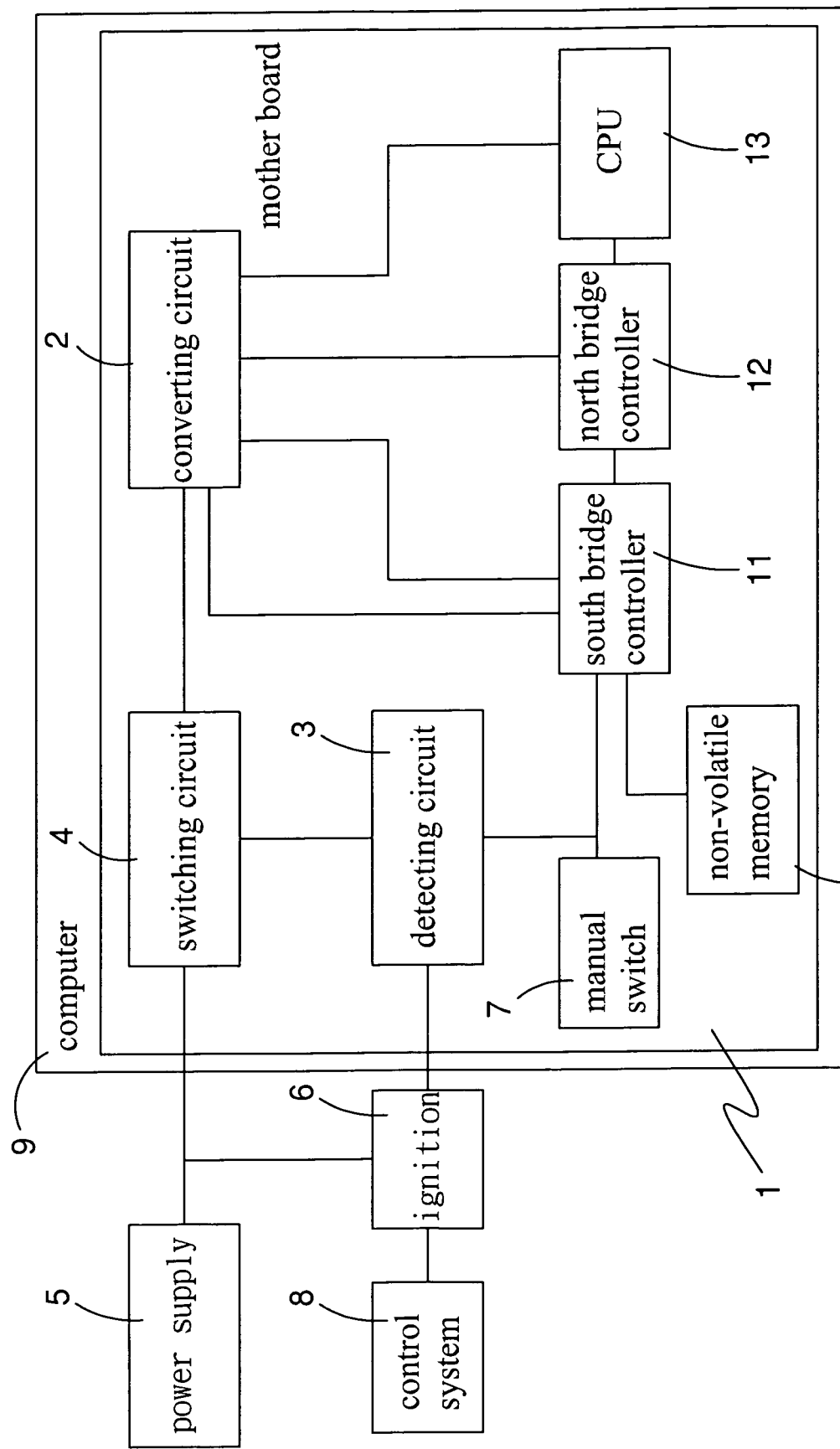
FIG. 1 is a block diagram of a computer according to the preferred embodiment of the present invention.

Referring to FIG. 1, according to the preferred embodiment of the present invention, a computer 9 can be installed and used in a vehicle such as a car, a boat and an aircraft. The vehicle includes a power supply 5, an ignition 6 connected to the power supply 5 and a control system 8 connected to the ignition 6. The ignition 6 is generally operated with a key to start or stop the vehicle.

On receiving an ON signal from the ignition 6, the computer 9 starts a basic input/output system (the "BIOS"). On receiving an OFF signal from the ignition 6, the computer 9 stops an operation system (the "OS"). In more detail, the computer 9 includes a mother board 1 and peripherals such as an optical disc drive (not shown), a hard disc drive (not shown) and a display (not shown).

The mother board 1 includes a detecting circuit 3, a switching circuit 4, a converting circuit 2, a manual switch 7, a south bridge controller 11, a north bridge controller 12, a central processing unit 13 (the "CPU"), a non-volatile memory 10 and a primary memory (not shown).

The detecting circuit 3 is connected to the ignition 6. The detecting circuit 3 is used to detect the state of the ignition 6.

The switching circuit 4 is connected to the power supply 5 on one hand and connected to the detecting circuit 3 on the other hand. The switching circuit 4 is used to receive electricity from the power supply 5 and turn on and off the computer 9.

The converting circuit 2 is connected to the switching circuit 4. The converting circuit 2 is used to convert the electricity from a first format for the power supply 5 into a second format in conformity with AXT regulations for the computer 9.

The south bridge controller 11 is connected to the converting circuit 2. The south bridge controller 11 receives electricity and a POWER-READY signal from the converting circuit 2. Moreover, the south bridge control 11 is connected to the detecting circuit 3.

The south bridge controller 11 is used as a core for control and calculation. The south bridge controller 11 is used to execute the BIOS for conducting a starting procedure, such as POST, to complete the actuation of the computer 9. Moreover, the south bridge controller 11 is used to transfer the OS to the primary memory from the hard disc drive. In addition, the south bridge controller 11 is used to stop the OS, i.e., instruct the OS to execute a terminating procedure to completely stop the computer 9.

The north bridge controller 12 is connected to the converting circuit 2 on one hand and connected to the south bridge controller 11 on the other hand.

The CPU 13 is connected to the converting circuit 2 on one hand and connected to the north bridge controller 12 on the other hand.

The non-volatile memory 10 is connected to the south bridge controller 11. The non-volatile memory 10 is used to store the BIOS.

The manual switch 7 is connected to the south bridge controller 11 on one hand and connected to the detecting circuit 3 on the other hand.

Figure 2:
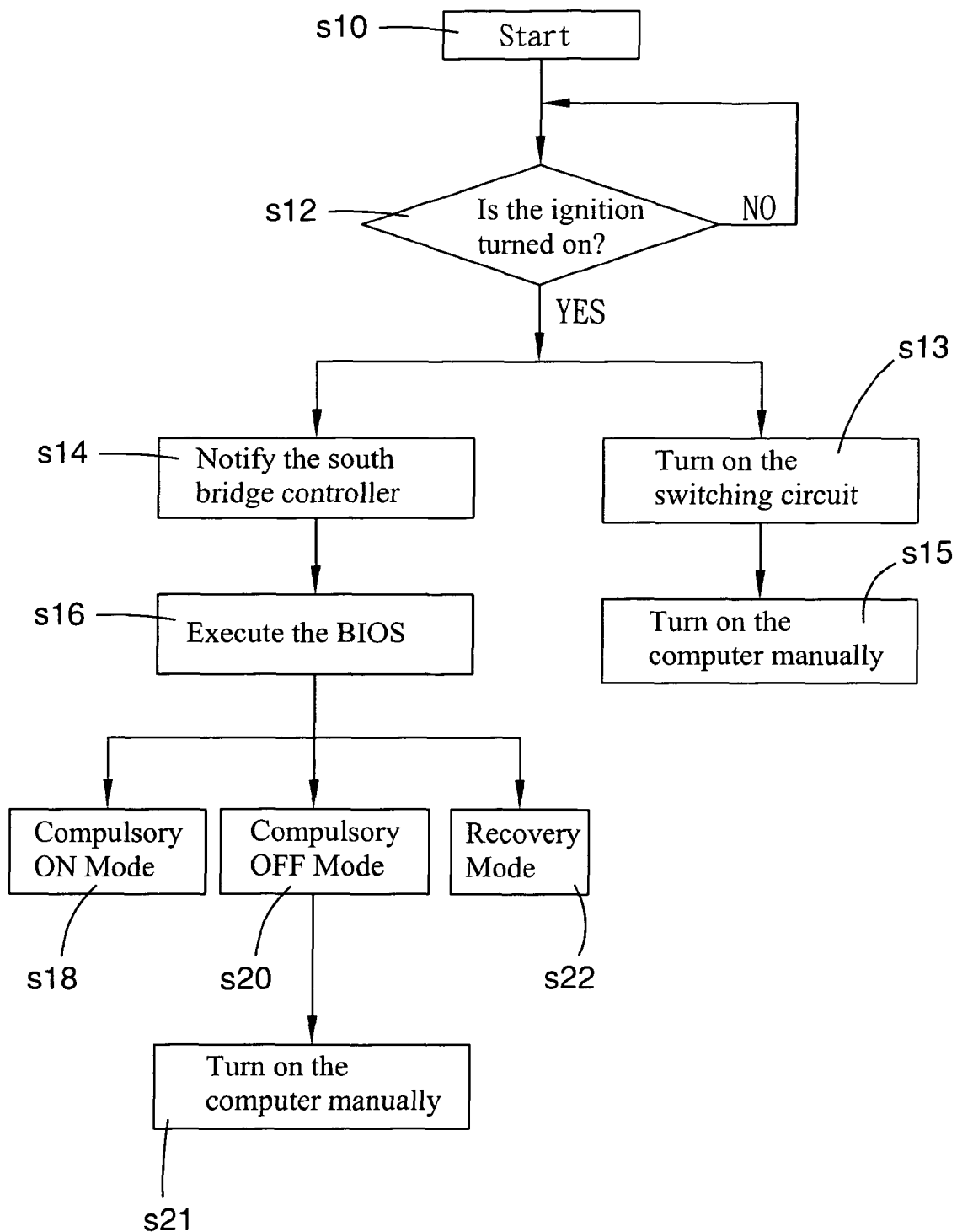
FIG. 2 is a flowchart of a method for operating the computer shown in FIG. 1.

The computer 9 is operated according to a process shown in FIG. 2.

At a step S10, the process is started.

At a step S12, the detecting circuit 3 detects the state of the ignition. If the ignition 6 is turned off, the process returns to the step S10. If the ignition 6 is turned on, the process goes to a step S13 on one hand and goes to a step 14 on the other hand.

At the step S13, the detecting circuit 3 sends an ON signal to the switching circuit 4. The switching circuit 4 transfers the electricity to the converting circuit 2. The converting circuit 2 converts the electricity into the second format from the first format and then sends the electricity to the south bridge controller 11, the north bridge controller 12 and CPU 13.

At a step S15, the manual switch 7 is maneuvered to turn on the computer 9.

At the step S14, the detecting circuit 3 notifies the south bridge controller 11 of the state of the ignition 6.

At a step S16, the south bridge controller 11 executes the BIOS in order to turn on the computer 9. The BIOS provides three modes regarding the ON and OFF states of the computer 9. The first mode is a compulsory ON mode. The second mode is a compulsory OFF mode. The third mode is recovery mode.

At a step S18, the compulsory ON mode is selected, the computer 9 is turned on.

At a step S20, the compulsory OFF mode is selected, the computer 9 is in "off" state. The process may go from the step S20 to a step S21 where the manual switch 7 is maneuvered to turn on the computer 9.

At a step S22, the recovery mode is selected. The computer 9 is turned on if the computer 9 is on the last time the ignition 6 is turned off. The computer 9 is turned off if the computer 9 is off the last time the ignition 6 is turned off.

The process returns to the step S10 from the steps S18, S21 and S22.

If the ignition 6 is turned to the OFF state from the ON state, the detecting circuit 3 detects this change and sends an OFF signal to the south bridge controller 11.

On receiving the OFF signal, the south bridge controller 11 instructs the OS to execute the terminating procedure to completely stop the computer 9. After stopping the computer 9, the south controller 11 sends a FINISH signal to the detecting circuit 3. On receiving the FINISH signal, the detecting circuit 3 turns off the switching circuit 4 so that the supply of the electricity is interrupted.

It takes a period of time (the "normal period") for the OS to stop the computer 9. In some undesirable circumstances, the computer 9 might however not be stopped so that the south bridge controller 11 might not send any FINISH signal to the detecting circuit 3. Should this happen, the power supply 5 would continue to energize the computer 9 and run out of electricity.

To avoid the foregoing problem, a timer may be incorporated in the detecting circuit 3. A waiting period is set in the timer. The waiting period is longer than the normal period. If not receiving any FINISH signal, the detecting circuit 3 turns off the switching circuit 4 after the waiting period.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A mother board of a computer used in a vehicle comprising a power supply and an ignition connected to the power supply, the mother board comprising:

a converting circuit for converting electricity;

a switching circuit for controlling the transfer of electricity to the converting circuit from the power supply of the vehicle;

a detecting circuit for detecting the state of the ignition of the vehicle, sending an ON signal and instructing the switching circuit to conduct the transfer if the ignition is turned on, and sending an OFF signal and instructing the switching circuit to interrupt the transfer if the ignition is turned off;

a central processing unit for receiving electricity from the converting circuit and executing an operation system to turn on and off the computer; and a south bridge controller for receiving electricity from the converting circuit and executing a basic input/output system to instruct the central process to turn on the computer on receiving the ON signal and turn off the computer on receiving the OFF signal.

2. The mother board according to claim 1 wherein after the computer is turned off, the south bridge controller transfers a FINISH signal to the detecting circuit that in turn instructs the switching circuit to interrupt the transfer.

3. The mother board according to claim 1 wherein the detecting circuit instructs the switching circuit to interrupt the transfer a waiting period after sending the OFF signal.

4. The mother board according to claim 3 wherein the waiting period is longer than a normal period for the computer to complete the terminating procedure.

5. The mother board according to claim 1 comprising a manual switch connected to the south bridge controller.

6. The mother board according to claim 1 wherein the basic input/output system provides:

an ON mode for turning on the computer;

an OFF mode for turning off the computer; and a RECOVERY mode for turning on the computer if the computer is on the last time the south bridge controller receives the ON signal and turning off the computer if the computer is off the last time the south bridge controller receives the OFF signal.

7. The mother board according to claim 1 wherein the converting circuit sends a POWER-READY signal to the south bridge controller when the transfer is ready.

8. A method for turning on and off a computer used in a vehicle equipped with a power supply and an ignition, the method comprising the steps of:

converting electricity;

controlling the transfer of electricity to a converting circuit of the computer from the power supply of the vehicle;

detecting the state of the ignition of the vehicle;

if the ignition is turned on, starting the transfer and sending an ON signal to the computer so that the computer can execute an starting procedure; and if the ignition is turned off, interrupting the transfer and sending an OFF signal to the computer so that the computer can execute a terminating procedure.

9. The method according to claim 8 comprising the step of interrupting the transfer after the terminating procedure is completed.

10. The method according to claim 8 comprising the step of interrupting the transfer a waiting period after sending the OFF signal.

11. The method according to claim 10 wherein the waiting period is longer than a normal period for the computer to complete the terminating procedure.

\* \* \* \* \*